United States Patent
Stanford-Clark

(10) Patent No.: US 7,607,007 B2
(45) Date of Patent: Oct. 20, 2009

(54) METHOD AND APPARATUS FOR MESSAGE ROUTING IN A COMPUTER SYSTEM

(75) Inventor: Andrew James Stanford-Clark, Chale (GB)

(73) Assignee: International Business Machines Corporation, Armonk, NY (US)

( * ) Notice: Subject to any disclaimer, the term of this patent is extended or adjusted under 35 U.S.C. 154(b) by 1582 days.

(21) Appl. No.: 10/155,193

(22) Filed: May 24, 2002

(65) Prior Publication Data

US 2002/0199121 A1 Dec. 26, 2002

(30) Foreign Application Priority Data

Jun. 23, 2001 (GB) .................. 0115404.6

(51) Int. Cl.
*H04L 9/00* (2006.01)

(52) U.S. Cl. .................. 713/152; 713/153; 713/170; 709/238; 709/247

(58) Field of Classification Search ......... 713/152–153, 713/181
See application file for complete search history.

(56) References Cited

U.S. PATENT DOCUMENTS

| | | | |
|---|---|---|---|
| 5,030,948 A * | 7/1991 | Rush .................. 340/7.46 |
| 5,771,289 A * | 6/1998 | Kuzma .................. 713/153 |
| 5,781,632 A * | 7/1998 | Odom .................. 705/78 |
| 5,893,911 A * | 4/1999 | Piskiel et al. .................. 707/10 |
| 6,122,378 A * | 9/2000 | Yoshiura et al. .................. 380/217 |
| 6,219,791 B1 * | 4/2001 | Blanchard et al. .................. 713/151 |
| 6,389,461 B1 * | 5/2002 | Shah .................. 709/217 |
| 6,493,342 B1 * | 12/2002 | Breslow et al. .................. 370/394 |
| 6,493,761 B1 * | 12/2002 | Baker et al. .................. 709/230 |
| 6,535,526 B1 * | 3/2003 | Oyamada et al. .................. 370/477 |
| 6,549,957 B1 * | 4/2003 | Hanson et al. .................. 710/5 |
| 6,618,397 B1 * | 9/2003 | Huang .................. 370/474 |
| 6,760,345 B1 * | 7/2004 | Rosengard .................. 370/477 |
| 7,020,717 B1 * | 3/2006 | Kovarik et al. .................. 709/238 |
| 7,188,142 B2 * | 3/2007 | Chi et al. .................. 709/206 |
| 2001/0003202 A1 * | 6/2001 | Mache et al. .................. 713/153 |
| 2003/0074552 A1 * | 4/2003 | Olkin et al. .................. 713/150 |

* cited by examiner

*Primary Examiner*—Nasser G Moazzami
*Assistant Examiner*—Fikremariam Yalew
(74) *Attorney, Agent, or Firm*—Winstead P.C.; Andre Gibbs

(57) ABSTRACT

Method and apparatus for message routing in a computer system (100) is provided. The method includes the steps of: receiving a message in a compressed or encrypted form (302, 402); extracting a portion of the message in its compressed or encrypted form (304, 404); comparing the portion of the message with samples of message portions in compressed or encrypted form (306, 406); and, if a match is found (308, 408), transmitting the entire message to destinations listed in association with the matched sample (310, 410).

7 Claims, 5 Drawing Sheets

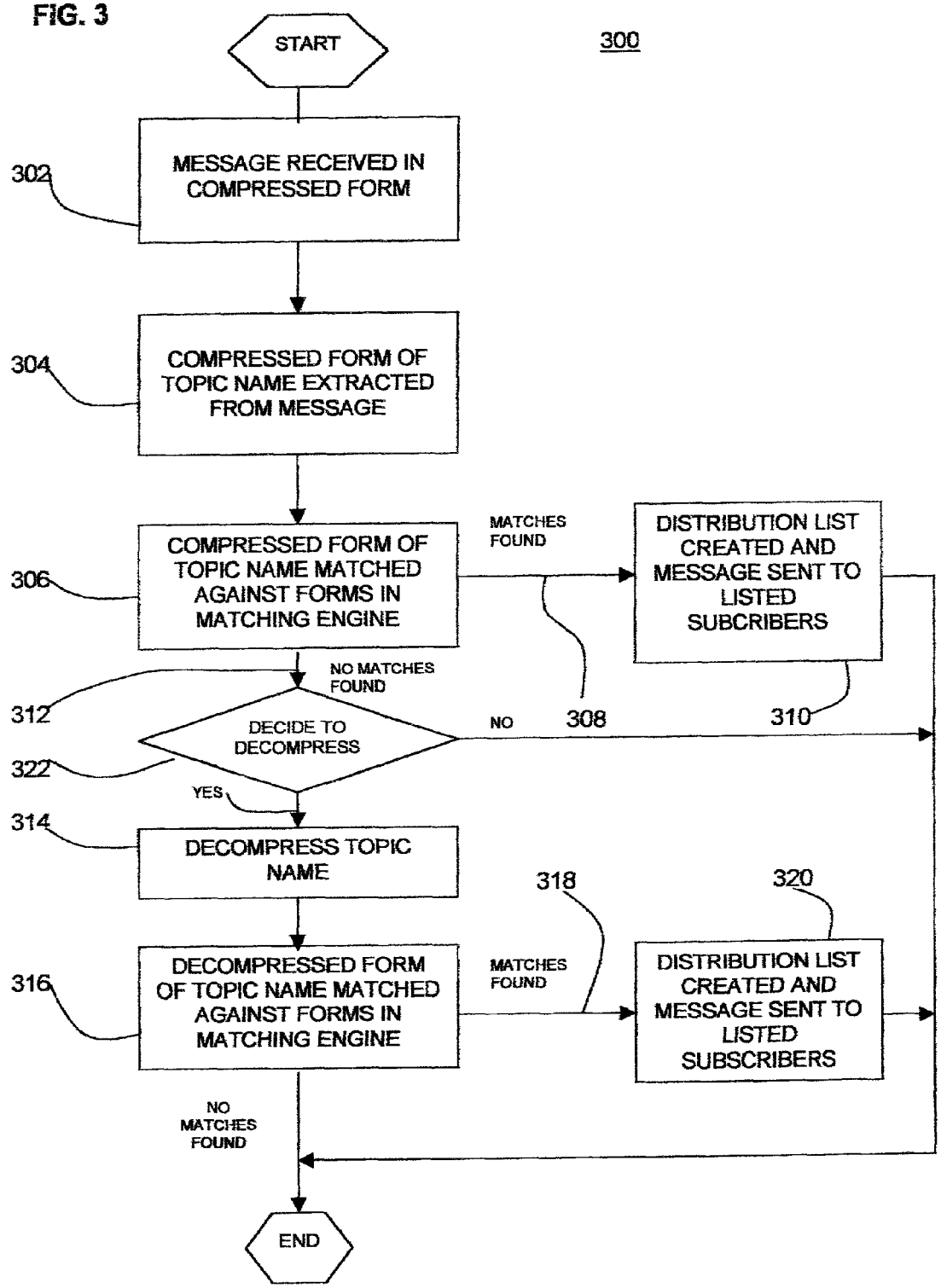

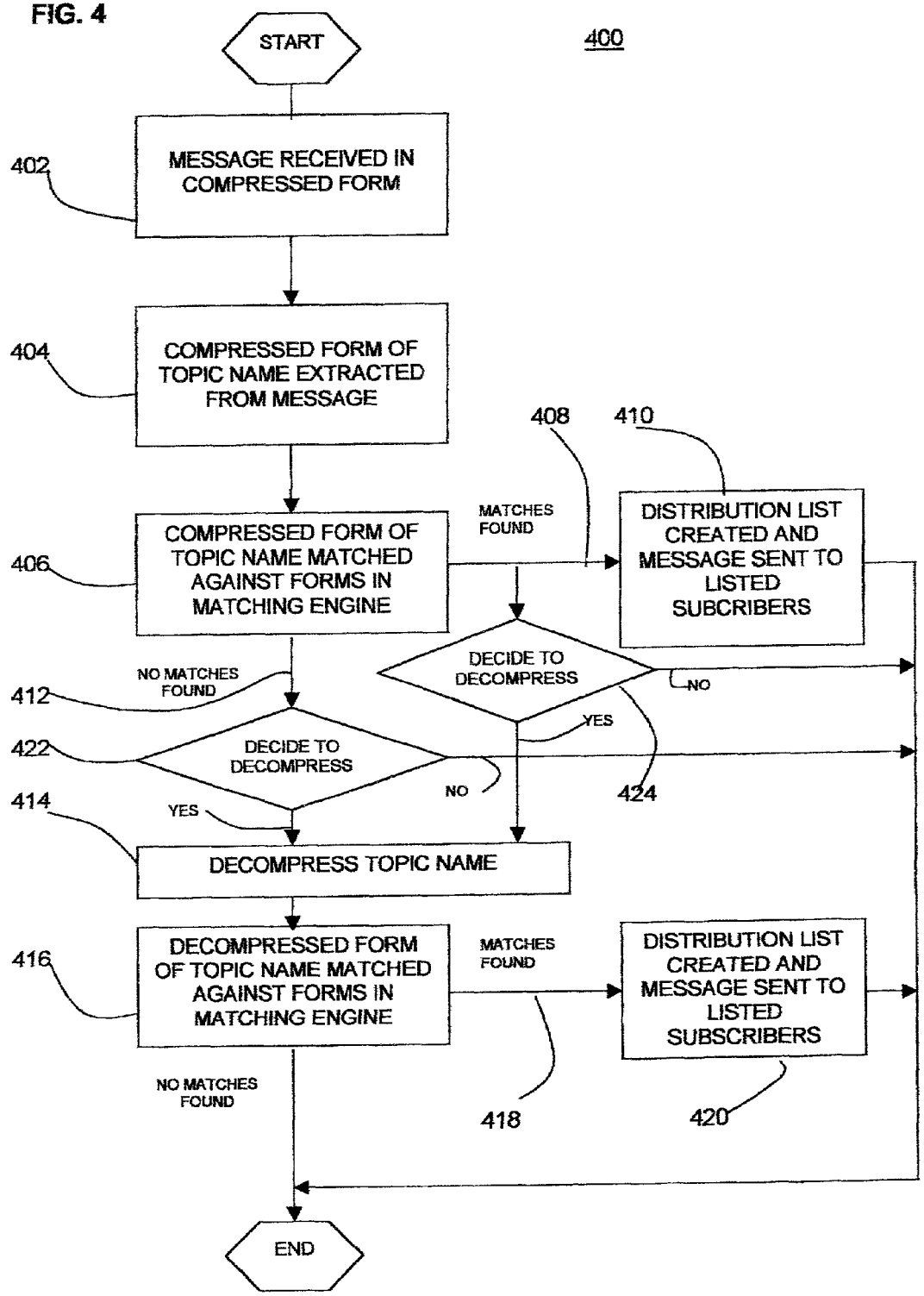

METHOD AND APPARATUS FOR MESSAGE ROUTING IN A COMPUTER SYSTEM

FIELD OF THE INVENTION

This invention relates to a method and apparatus for message routing in a computer system, in particular for message routing using compressed or encrypted topic names.

BACKGROUND OF THE INVENTION

The invention relates to the field of message transfer. The invention is described in the context of the messaging system, MQSeries Integrator provided by International Business Machines Corporation (MQSeries is a trade mark of International Business Machines Corporation). However, the invention can be used in any situation or environment in which messages are transferred.

MQSeries applications can pass messages between queues in applications, which can be located anywhere in a customer's enterprise. Applications can also exchange messages with applications from a customer's clients in locations remote from the customer. As customers look to do more complex tasks and to put their data to more productive use, there is a need to process and transform the message data before passing the message on to the next application.

A message broker provides a hub for processing, transformation and distribution of messages. Message brokers act as a way station for messages passing between applications Once messages have reached the message broker they can proceed, depending on the configuration of the message broker and on the contents of the message.

The message broker has a message flow framework including publish and subscribe management and message storage resources. A control center of the message broker controls the message flows. Within the message broker, the individual functions are assigned to a collection of interconnected constructs called nodes, where the processing and transformation activities can take place as required.

The MQSeries Integrator product supports the application communication model known as publish/subscribe. In this model, applications known as publishers send messages and others, known as subscribers, receive messages. Applications can also be both publishers and subscribers. The publishers are not interested in where their publications are going, and the subscribers are not concerned where the messages they receive have come from. The broker assures the integrity of the message source, and manages the distribution of the message according to the valid subscriptions registered in the broker.

The interactions between a broker and its publisher and subscriber applications are equally valid in a broker network in which publish/subscribe applications are interacting with any one of a number of connected brokers. Subscriptions and published messages are propagated through the broker domain. Brokers can propagate subscription registrations through the network of connected brokers, and publications can be forwarded to all brokers that have matching subscriptions. When the term "broker" is used it generally includes a single broker or multiple brokers working together as a network to act as a single broker.

A message flow running in the message broker retrieves a publication from its input mechanism, performs any processing that is defined for publications received in that message flow and passes the message to a publication node for distribution to one or more subscribers. The input and output mechanisms of the broker may be in the form of asynchronous connections such as input and output queues, synchronous connections such as input and output nodes with direct client connection via TCP/IP connections, a combination of such input and output mechanisms, or other connections via mobile telecommunication, email etc. All these forms of input and output to and from the broker are referred to generally as input and output mechanisms.

The publication node only knows about, and can therefore only provide messages to, an application that has registered as a subscriber. When the application registers, it must specify a means by which it wants to receive messages (which may be a queue or other input mechanism) and a definition that restricts the messages it wants to receive. The definition can be based on a combination of the topic of the message or specific content within the message or both.

In some situations, it is desirable to make the messages between publishers, subscribers, and a message broker as small as possible. This is often because of low interconnection bandwidth, or high cost per byte for data transmission between remote client computer systems. Value can be gained from compressing information sent in a message. For example, in remote telemetry in which distant events are measured and the data transmitted in the form of a message, every byte transmitted has a cost.

In such cases, it is common to compress all or some of the message before transmission from publisher to broker and to decompress it in the broker to allow it to be inspected to find out essential information, like the topic name, and other publication parameters such as quality of service, etc. The most likely candidates for compression are the topic name and the message "payload", which is the body of the message which is being delivered. The topic name is often quite verbose, in a form like a uniform resource locator, in a potentially detailed topic space, for example, "weather/location_1/humidity/indoor/high".

After matching against the subscription lists of subscriber clients, the message is typically recompressed before being sent out to those subscribers who have expressed an interest in the particular topic of the message.

In other situations, messages are encrypted before sending between publishers, subscribers and a message broker in order to ensure that the message is not intercepted and read by a party other than the intended recipient of the message. The encryption may result in the message being longer than the unencrypted form.

This compression, decompression and recompression or encryption, decryption and re-encryption is time consuming, processor intensive, and diminishes the performance of the broker in terms of total message throughput rate. This invention proposes a solution to this problem. An aim of the invention is to provide efficient processing of compressed or encrypted messages when they arrive in a message broker.

DISCLOSURE OF THE INVENTION

According to a first aspect of the present invention there is provided a method of message routing in a computer system comprising the steps of: receiving a message in a compressed or encrypted form; extracting a portion of the message in its compressed or encrypted form; comparing the portion of the message with samples of message portions in compressed or encrypted form; and, if a match is found, transmitting the entire message to destinations listed in association with the matched sample.

In one embodiment, the samples of message portions in compressed or encrypted form may be tied to the uncompressed or unencrypted forms of the message portions.

Preferably, the method includes the steps of: subsequently decompressing or decrypting the portion of the message; comparing the uncompressed or unencrypted form of the portion of the message with samples of message portions in uncompressed or unencrypted form; and, if a match is found, transmitting the entire message to destinations listed in association with the matched sample. The step of comparing the uncompressed or unencrypted form of the portion of the message may include comparing to samples with wildcard or filtering characters.

The portion of the message is preferably compressed or encrypted in a hierarchical form such that wildcard or filtering can be carried out in the comparing step.

Preferably, the portion of the message is the message topic name. The computer system is, for example, a message broker and messages are routed from publisher to subscriber applications. The publisher and subscriber applications are in one embodiment remote from the broker or alternatively are in one location.

According to a second aspect of the present invention there is provided a method for managing subscriptions in a computer system comprising the steps of: receiving a message in a compressed or encrypted form; extracting a portion of the message in its compressed or encrypted form; storing the portion of the message as one of the samples suitable for use in the method as described above.

According to a third aspect of the present invention there is provided an apparatus for message routing in a computer system comprising: means for receiving a message in a compressed or encrypted form; means for extracting a portion of the message in its compressed or encrypted form; means for comparing the portion of the message with samples of message portions in compressed or encrypted form; and, if a match is found, means for transmitting the entire message to destinations listed in association with the matched sample.

In one embodiment, the samples of message portions in compressed or encrypted form are tied to the uncompressed or unencrypted forms of the message portions. The apparatus preferably includes: means for subsequently decompressing or decrypting the portion of the message; means for comparing the uncompressed or unencrypted form of the portion of the message with samples of message portions in uncompressed or unencrypted form; and, if a match is found, means for transmitting the entire message to destinations listed in association with the matched sample.

The means for comparing the uncompressed or unencrypted form of the portion of the message preferably includes comparing to samples with wildcard or filtering characters.

The portion of the message is preferably compressed or encrypted in a hierarchical form such that wildcard or filtering can be carried out in the comparing step.

Preferably, the portion of the message is the message topic name. The computer system is, for example, a message broker and messages are routed from publisher to subscriber applications. The publisher and subscriber applications are in one embodiment remote from the broker or are alternatively in one location.

According to a fourth aspect of the present invention there is provided apparatus for managing subscriptions in a computer system comprising the steps of: means for receiving a message in a compressed or encrypted form; means for extracting a portion of the message in its compressed or encrypted form; means for storing the portion of the message as one of the samples suitable for use by the apparatus as described above.

According to a fifth aspect of the present invention there is described a computer program stored on a computer readable storage medium, comprising computer readable program code means for performing the steps of: receiving a message in a compressed or encrypted form; extracting a portion of the message in its compressed or encrypted form; comparing the portion of the message with samples of message portions in compressed or encrypted form; and, if a match is found, transmitting the entire message to destinations listed in association with the matched sample.

According to a sixth aspect of the present invention there is described a computer program stored on a computer readable storage medium, comprising computer readable program code means for performing the steps of: receiving a message in a compressed or encrypted form; extracting a portion of the message in its compressed or encrypted form; storing the portion of the message as one of the samples suitable for use by the computer program as described above.

BRIEF DESCRIPTION OF THE DRAWINGS

Embodiments of the present invention are now described, by means of examples only, with reference to the accompanying drawings, in which:

FIG. 3 is a flow diagram of a first embodiment of the present invention; and

FIG. 4 is a flow diagram of a second embodiment of the present invention.

DESCRIPTION OF THE PREFERRED EMBODIMENTS

Figure 1:
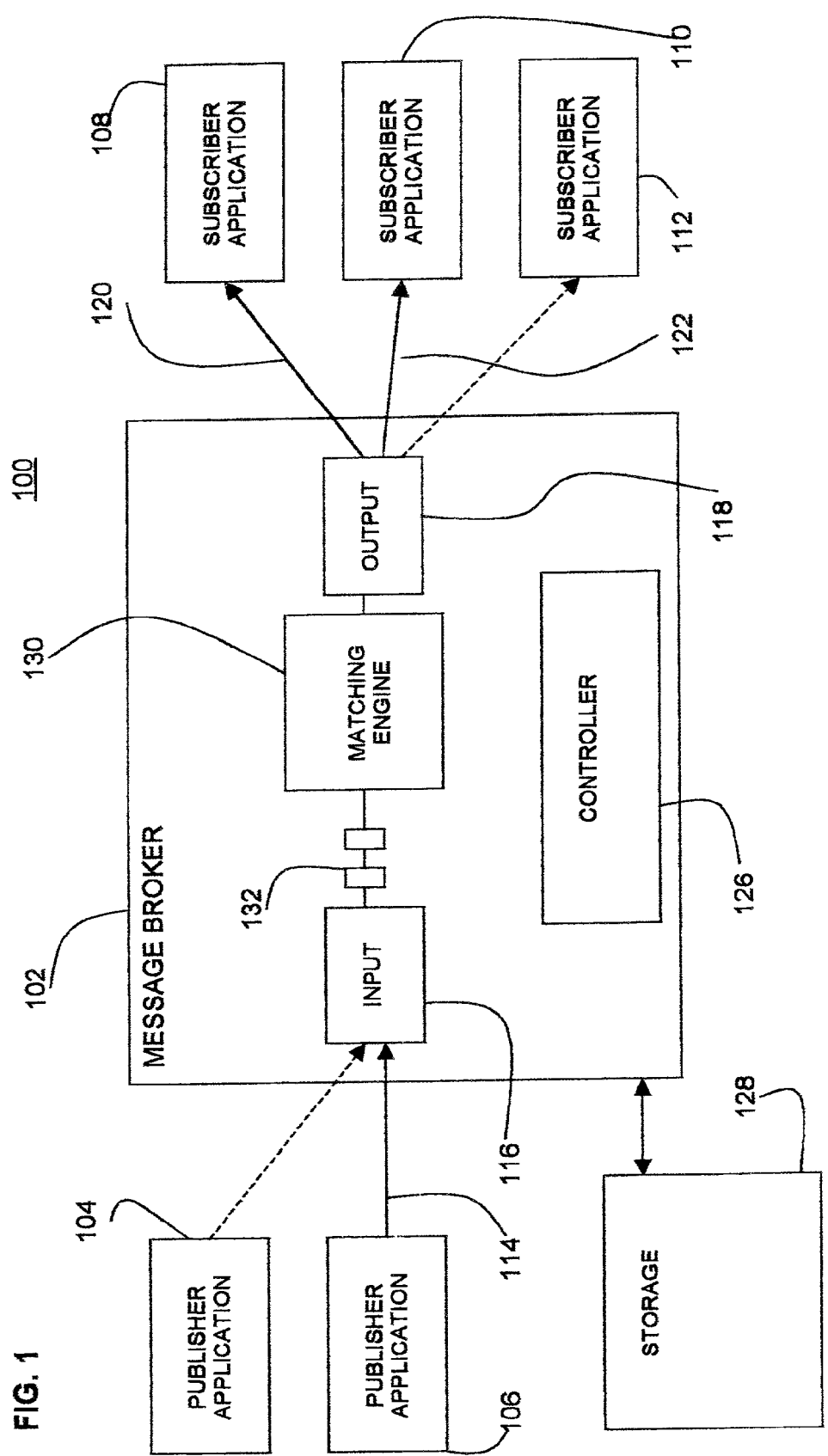
FIG. 1 is a diagrammatic representation of a message broker system in accordance with a preferred embodiment of the present invention.

Messages flowing through a message broker can be in a number of different formats. The structure of the data within the message generally includes a header and a body. The header provides the information the receiving system needs to know about the message including delivery details and message parameters. The body provides the information being sent in the message to the receiver sometimes referred to as the payload. The first n bytes are known by the system to be the header and read accordingly.

A message can contain a description of the topic of the message. This topic field can be in the header, separate from the header and body, or in the body of the message.

In the SCADA (supervisory, control and data acquisition) system which is used for telemetry, messages are sent using MQIsdp (MQSeries Integrator SCADA device protocol) in which messages have the form of a header, topic and payload. The header includes the following information:

the message type;
the quality of service which is an assurance of delivery;
a retain flag which is an instruction to the message broker to retain the message;
the message identifier;
a duplicate flag which indicates if the message is a resend; and
a message length field which details how much more of the message there is.

The topic describes the subject matter of the message and may be in the form of a hierarchical topic string. The payload is the actual data being transmitted.

In the MQSeries system, the body may have a section called an extended header which contains details about the topic of the payload and publish and subscribe parameters, as well as the separate header field. This can be referred to as a low level header and a high level header. In the MQSeries system low level header contains the following information about the message which provides a definition of the message to the message broker:

the message domain, which describes the source of the message definition.

the message set, or project, groups together a collection of messages, elements or types, within a specified domain, going to make up a complete definition of messages relating to a particular flow or business operation.

the message type that will precisely define the structure of the data within the message, giving such details as the number and location of character strings.

the message format that identifies the wire format of the message.

The topic name can be a long string, for example, "weather/location_1/humidity/indoor/high". The topic level separator character "/" provides a hierarchical structure to the topic name and is used by applications to denote levels within a topic tree. The use of the topic level separator is significant when wildcard characters are used in topics specified by subscriber applications.

In some circumstances the topic name or string can form a large proportion of the entire message. For example, in remote monitoring applications such as measuring flow rates in oil pipelines and other telemetry and SCADA applications. The topic name or identifier forms the bulk of the message (40-50 characters). The actual data or payload may only be 10 to 15 bytes long.

The embodiments given are described in the context of the messaging system, MQSeries Integrator provided by International Business Machines Corporation (MQSeries is a trade mark of International Business Machines Corporation). However, the described method and apparatus can be used in any situation or environment in which messages are transferred in compressed or encrypted form.

In publish and subscribe message transfer systems, the topic name is used to identify to which subscriber applications the published message should be sent. A distribution list of subscribers for particular topics defined in the topic name is compiled in a message broker from information provided by the subscribers. The terms publisher and subscriber applications are used throughout the description; however, any sending and receiving applications within a computer system or network could be substituted for these terms.

In some situations, all or part of the message is compressed before transmission. Compression makes the message size as small as possible, increasing the transfer rate of messages in a system.

In other situations, some or all of the message may be encrypted before transmission to ensure that the message cannot be read by another party who may access the message during transmission. Encrypted messages may be smaller, the same size or larger than the original message.

Examples of compression and encryption methods include: Huffman compression; LZW compression; Public Key encryption; XOR encryption; run-length encoding (RLE); simple cipher systems. These methods are listed as examples and should not be taken as a complete list of possible methods. The described method for message routing can be used with any form of compression or encryption.

In the described embodiments a compressed message is referred to. It will be appreciated that an encrypted message could equally be used and the term compressed should be read as including compression and encryption treatment of messages.

Referring to FIG. 1, a computer messaging system 100 is shown in the form of a message broker 102 with two publisher applications 104, 106 and three subscriber applications 108, 110, 112. The publisher and subscriber applications may be computer programs within a network of computer systems or may be in a single computer. The network may have more than one message broker in the form of a managing resource to which applications can publish and subscribe. In the illustrated example, two publisher applications 104, 106 and three subscriber applications 108, 110, 112 are shown; however, it will be appreciated by a person skilled in the art that this is an example only and an infinite number of arrangements of applications and brokers is possible and only a very simple example is shown.

The message broker 102 has a controller 126 for processing messages and storage means 128 for storing messages in transit. The message broker 102 has an input mechanism 116 which may be an input queue or a synchronous input node by which messages are input when they are sent by a publisher application 104, 106 to the message broker 102. The message broker 102 has an output mechanism 118 by which messages are output once they have been processed by the message broker 102 and are transmitted to specified subscriber applications.

A message sent by a publisher application 106 is transmitted 114 to the message broker 102 and is received by the message broker 102 into the input mechanism 116. The message is fetched from the input mechanism 116 by the controller 126 of the message broker 102 and processed to determine to which subscriber applications 108, 110, 112 the message should be sent and whether the message should be transformed in transformation steps 132 or interrogated before sending. Once processed, the message is sent to an output mechanism 118 for sending. There may be more than one input and output mechanism to and from which messages are received and sent by the message broker 102.

In the illustrated example in FIG. 1, a message is transmitted 114 from a single publisher application 106 to the input mechanism 116 of the message broker 102. The message is processed in the message broker 102 and put into the output mechanism 118 for sending to two subscriber applications 108, 110 transfers 120, 122.

A matching engine 130 is provided in the message broker 102. The matching engine 130 compares a portion of the message which defines the topic of the message, hereinafter referred to as the topic name, with subscribers' pre-specified requirements. A subscriber application can specify that it wishes to receive messages including a topic string (for example, "weather/London/temp") and any messages matching the topic string will be identified and sent to the subscriber application. The matching process also includes the possibility of wildcards in the topic string (for example, weather/*/temp). The matching engine satisfies some matching function defined on the topic string. The process of the matching engine 130 is described in detail below.

In the message broker 102, the topic name is extracted from the message, still in its compressed form.

In known existing messaging systems, the entire message including the header, any topic field and the payload or body is compressed or encrypted as a single entity. The header or topic cannot be extracted from the message without decompressing or decrypting the entire message.

Figure 2A:
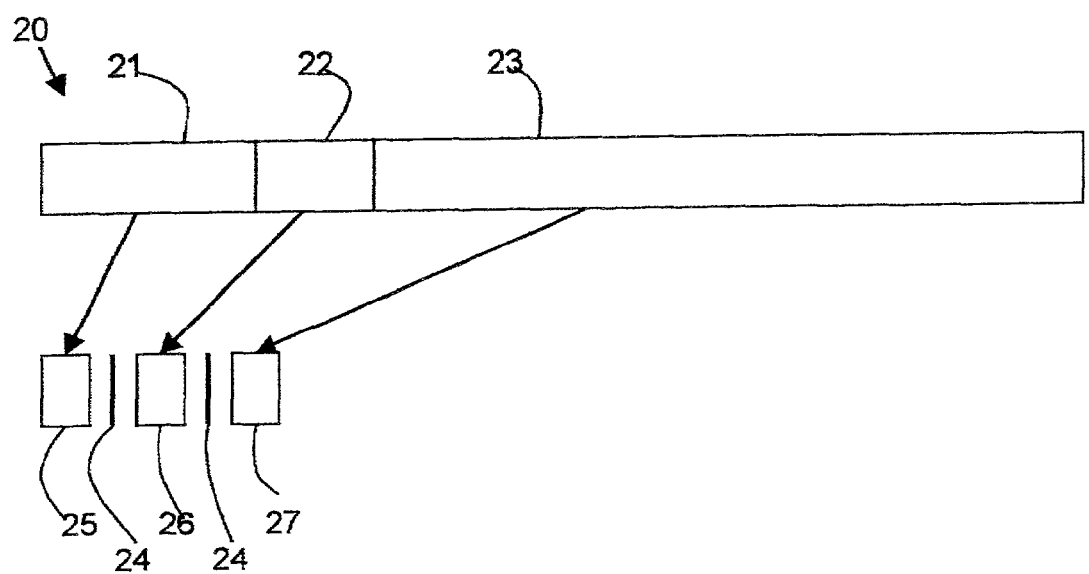
FIG. 2a is a diagrammatic representation of the components of a message to be sent in accordance with a preferred embodiment of the present invention.

FIG. 2a shows a message in accordance with a preferred embodiment of the present invention in which the message 20 has a header 21, a topic name 22 and a payload 23. The three components 21, 22, 23 are compressed or encrypted separately with clear delimiters or boundaries 24 between the compressed or encrypted components 25, 26, 27. In one embodiment, the delimiters 24 are in the form of special characters between the components 25, 26, 27 although this does use up space in the message. Alternatively, the delimiters or boundaries 24 are defined by information built into the message, for example that the topic name occurs after the first byte of the message and continues to the end of the fourth byte. This information is preferably built into the message somewhere where it can be extracted, for example in the header of the message. It will be appreciated that the form of the delimiters as described is by way of example only and is not limited to either of the above.

Not all the components 21, 22, 23 of the message 20 need to be compressed. The header 21 may not be compressed. Also, the payload 23 may not be compressed if it is short and contains random text. The header 21 can contain a flag to indicate whether or not the topic name 22 or any other part of the message 20 is compressed. This leads to a quicker processing of the message in the message broker.

In FIG. 2a, the uncompressed or unencrypted message 20 is shown. The compressed or encrypted message is then shown with delimiters 24 between the components 25, 26, 27. FIG. 2a shows that the topic name 26 can be extracted still in its compressed or encrypted form.

The message broker and the client application will preferably have agreed in advance which method of compression or encryption are to be used. There may be only one method used in the system or the method may be defined in the message itself.

Other publication parameters are also preferably extracted from the message, and thus possibly decompressed, but these are often only a few bits, and it is quite likely that these will have been considered unworthy of compression.

In the matching engine, as well as the fully expanded forms of the topic names, there are also entries for the compressed versions of the topic names. These entries are tied to their expanded equivalents in the sense that they have the same subscriber lists.

Figure 2B:
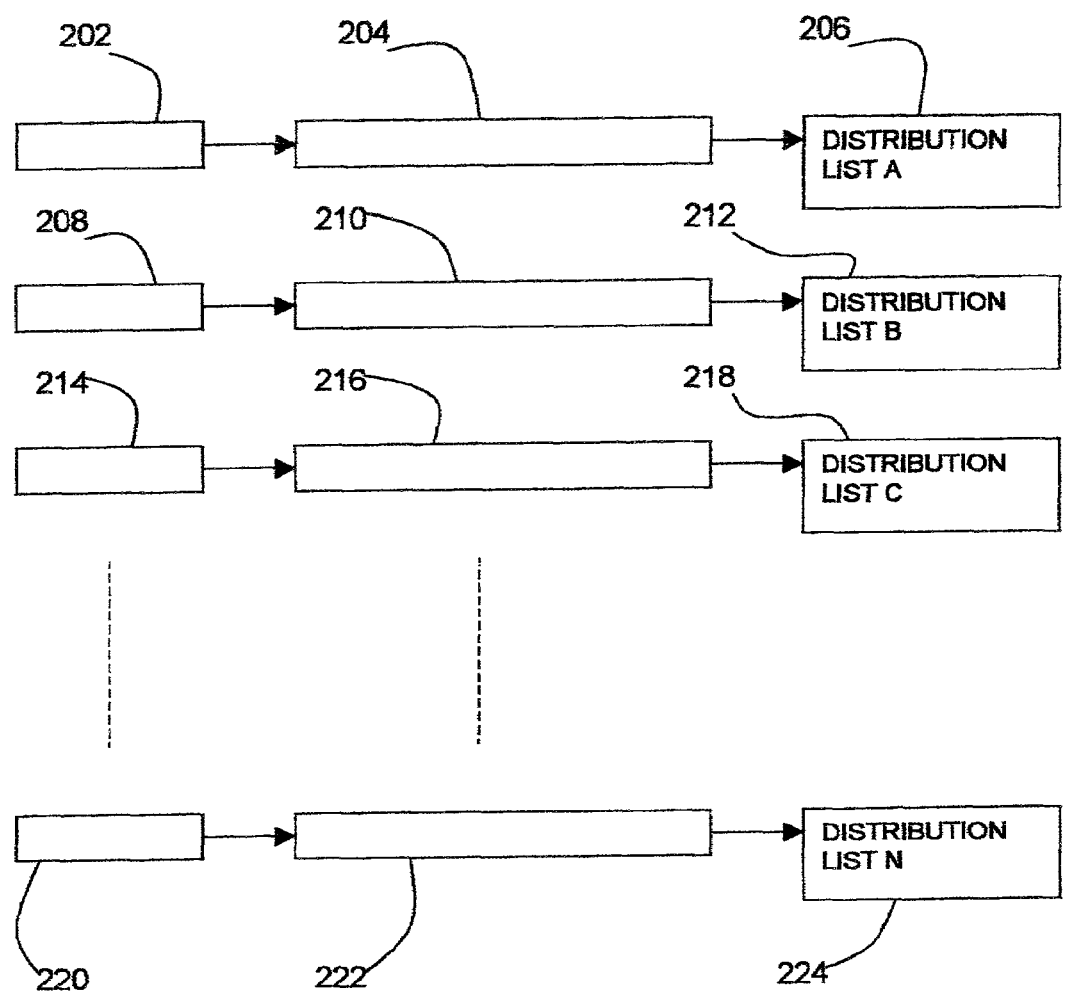
FIG. 2b is a diagrammatic representation of topic name matching in a system in accordance with a preferred embodiment of the present invention.

This is illustrated in schematic form in FIG. 2b, which shows a matching engine 200 with a first compressed form of topic name 202 which is tied to the expanded form of the same topic name 204 which has an associated list of subscribers 206 whose specified topics include the topic of the topic name 204 and to whom the message is to be sent. A second compressed form of topic name 208 is tied to the expanded form of the same topic name 210 which has an associated list of subscribers 212. A third compressed form of topic name 214 is tied to the expanded form of the same topic name 216 which has an associated list of subscribers 218. The matching engine 200 may contain n forms of compressed topic names 220 tied to their expanded forms 222 which have associated lists of subscribers 224.

An extracted compressed topic name is compared to the compressed topic names 202, 208, 214 to 220. If a match is found, the expanded form of the topic name can be determined and the message sent to the subscribers listed in the associated list of subscribers for the expanded topic name.

Thus a match against the compressed string 202, 208, 214, 220 is equivalent in effect to a match against the fully expanded form 204, 210, 216, 222, and so allows a distribution list 206, 212, 218, 224 to be created, without having to decompress the topic field, or any other part of the message.

Referring now to FIG. 3, a first embodiment of a method of routing messages is shown. The first embodiment of a method 300 of message routing in a computer system in the form of a message broker is shown as a flow diagram.

A message is received at a message broker in compressed form 302. The topic name for the message is extracted from the message 304 whilst maintaining the topic name in its compressed form. The compressed form of the topic name is sent to the matching engine and is compared 306 against compressed forms of topic names held in the matching engine.

The client applications and broker preferably agree on a compressed form for the topic name of messages. This may be a different compression form to that used for the payload portion of the message. Due to the agreement of the form of compression of the topic name, samples of compressed topic names can be provided in a matching engine for comparison to an extracted topic name for a recently received message.

If a match is found 308 of a sample compressed topic name in the matching engine and the compressed topic name extracted from the current message, a distribution list of applications to which the message is to be sent can be created 310. The sample compressed topic name in the matching engine is tied to the uncompressed form of the topic name which has an associated list of subscriber applications which wish to receive messages relating to the defined topic of the message.

As the compressed form of the topic name is tied to the uncompressed form of the topic name, the message broker can carry out any message transformation or interrogation required for the message. The compressed topic name can indicate that a transformation is needed and the body of the message can then be decompressed and the transformation carried out.

If there is no match against the compressed topic name 312 in the matching engine, then the topic name can then be decompressed 314. The decompressed topic name may then be sent back to the matching engine for matching against uncompressed samples of topic names 316. A flag in the message can tell the message broker in advance if the topic name is compressed, if the topic name is compressed and there is no match, then in the preferred embodiment there are no subscribers for the message and the message does not need to go any further unless there are wildcard subscriptions. Therefore, a decision 322 is made before decomprossing the topic name 314 to end the process if there are no wildcard subscriptions.

The steps of decompressing the topic name 314 and comparing with uncompressed samples 316 of topic names is preferably controllable as a configuration option in the message broker. These steps may be unnecessary in particular application contexts, and will remove some of the benefits of matching in the compressed space if the topic name has to be decompressed. However, only the topic name has to be decompressed, so there is still an advantage over solutions which require the whole message to be decompressed in order to extract the topic name.

FIG. 4 shows a second embodiment of a method of routing messages in a computer system. The method is similar to that of FIG. 3 in that a message is received in compressed form 402. The topic name is extracted from the message 404, the topic name still being in its compressed form. The compressed form of the topic name is compared 406 against samples of compressed topic names in a matching engine.

If matches are found for the compressed topic name 408, a distribution list is created and the entire message is sent to the listed subscriber applications 410.

If no matches are found 412 for the compressed form of the topic name 406, the topic name is decompressed 414. Also, if matches are found 408 for the compressed form of the topic name 406, the topic name is decompressed 414. Decisions 422, 424 can end the process before decompression 414 of the topic name if it is known that there are no wildcard subscriptions.

Whether or not matches are found using the compressed form of the topic name for comparison in the matching engine, there may be wildcard subscriptions which would not be matched in the compressed form. The comparison of the uncompressed form of the topic name will locate such wildcard subscriptions. If it is known that there are no wildcard subscriptions, then this step need not be carried out.

In accordance with the preferred embodiment, wildcard subscriptions are described in two forms. A multi-level wildcard character "#" and a single-level wildcard character "+", Other forms of wildcard characters or escape characters can be used.

A multi-level wildcard character is used to match any number of levels within a topic. It can be used only at the beginning or the end of a topic (but not both). For example, in a topic tree of "country/state/city" an application could subscribe to "USA/#", and receive messages on topics "USA/Alabama" and "USA/Alabama/Auburn". The way the multi-level wildcard is implemented means it can represent zero or more levels. Therefore, "USA/#" can also match the singular "USA" where # represents zero levels. The topic separator "/" is meaningless in this context because there is no level to separate.

A single-level wildcard character "+" matches one and only one topic level. For example, "USA/+" matches "USA/Alabama" but not "USA/Alabama/Auburn". Also because the single-level wildcard matches a single level only, "USA/+" does not match "USA". This wildcard can be used at any level in the topic tree, and in conjunction with the multi-level wildcard. However, the single-level wildcard can only be used next to the topic separator character unless the single-level wildcard is specified on its own, for example "USA+" is not valid, but "+" is valid.

The above are examples only of wildcard characters which may be supported by the matching engine. For a finer level of filtering of message topics, content filters can also be used, which operate on the payload portion of the message.

If there are some matches in the compressed form, then the message broker can initiate transmission of the message to those subscriber applications, while the broker continues with the more lengthy process of decompression and wildcard matching. Duplicate matches are preferably eliminated to avoid a message being sent more than once (unless required) due to a match in the compressed form and in the uncompressed form with a wildcard.

If the topic name is decompressed 414 and compared with uncompressed samples of the topic name 416 including using wildcard matching and a match is found 418 against at least one uncompressed form of the topic name, then a distribution list is created 420 from the subscriber applications associated with the sample topic name.

In a third embodiment of a method of message routing in a computer system, a form of wildcard matching is possible using the topic name in its compressed form. Instead of the full topic name being compressed, the topic name is compressed in a hierarchical form agreed between the publisher and subscriber applications and the broker. The topic name is compressed in a segmented way, for example, in the topic string "country/weather/temperature", country, weather and temperature will each be compressed separately Wildcarding can be based on the levels of the hierarchical tree. For wildcard subscriptions of "country/#" sent to the message broker, when a publication reaches the broker containing country in its topic name, the matching engine will search for the compressed form of "country". The message will then be sent to all subscriber applications associated with a topic name including the string "country".

This form of compression of the topic name removes the need for the topic name to be decompressed and compared in the matching engine as well as the compressed topic name as wildcard matching can be done using the compressed topic name. This form of compression is preferably enabled on a per-application basis, depending on the nature of the publisher and subscriber applications.

In one embodiment, a message broker supports both modes of full compression and topic compression for different publisher/subscriber sets.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications may be made to the foregoing without departing form the scope of the present invention.

What is claimed is:

1. A method of message routing in a computer system comprising steps of: receiving a message in a compressed or encrypted form; extracting a portion of the message in its compressed or encrypted form; comparing the portion of the message with samples of message portions in compressed or encrypted form; and if a match is found, transmitting the entire message to destinations listed in association with the matched samples; subsequently decompressing or decrypting the portion of the message; comparing the decompressed or decrypted form of the portion of the message with samples of message portions in uncompressed or unencrypted form; and if a match if found, transmitting the entire message to destinations listed in association with the matched sample; wherein the step of comparing the decompressed or decrypted form of the portion of the message includes comparing to samples with wildcard or filtering characters.

2. A method as claimed in claim 1, wherein the samples of message portions in compressed or encrypted form are tied to uncompressed or unencrypted forms of the message portions.

3. A method as claimed in claim 1, wherein the portion of the message is compressed or encrypted in a hierarchical form such that wildcard or filtering can be carried out in the comparing step.

4. A method as claimed in claim 1, wherein the portion of the message is the message topic name.

5. A method as claimed in claim 1, wherein the computer system is a message broker and messages are routed from publisher to subscriber applications.

6. Method for managing subscriptions in a computer system comprising the steps of:
receiving a message in a compressed or encrypted form;
extracting a portion of the message in its compressed or encrypted form;
storing the portion of the message as one of the samples suitable for use in the method of claim 1.

7. A computer program stored on a computer readable storage Medium, comprising computer readable program code for performing the steps of: receiving a message in a compressed or encrypted form; extracting a portion of the message in its compressed or encrypted form; comparing the portion of the message with samples of message portions in compressed or encrypted form; and if a match is found, transmitting the entire message to destinations listed in association with the matched samples; subsequently decompressing or decrypting the portion of the message; comparing the decompressed or decrypted form of the portion of the message with samples of message portions in uncompressed or unencrypted form; and if a match if found, transmitting the entire message to destinations listed in association with the matched sample; wherein the step of comparing the decompressed or decrypted form of the portion of the message includes comparing to samples with wildcard or filtering characters.

* * * * *

UNITED STATES PATENT AND TRADEMARK OFFICE
CERTIFICATE OF CORRECTION

PATENT NO. : 7,607,007 B2  
APPLICATION NO. : 10/155193  
DATED : October 20, 2009  
INVENTOR(S) : Andrew James Stanford-Clark It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2252 days.

Signed and Sealed this

Twelfth Day of October, 2010

David J. Kappos  
*Director of the United States Patent and Trademark Office*